United States Patent [19]

McDonald et al.

[11] 4,214,656
[45] Jul. 29, 1980

[54] CAP ORIENTING AND FEEDING APPARATUS

[75] Inventors: Walter McDonald, Landing; Norbert F. Seitel, Gillette, both of N.J.

[73] Assignee: Norwalt Design, Inc., Whippany, N.J.

[21] Appl. No.: 918,773

[22] Filed: Jun. 26, 1978

[51] Int. Cl.$^2$ ............................................. B65G 47/24
[52] U.S. Cl. .................................... 198/380; 198/396; 198/400; 193/46
[58] Field of Search .............. 198/380, 391, 392, 396, 198/400; 221/171, 172, 173, 259; 193/46, 47

[56] References Cited

U.S. PATENT DOCUMENTS

| 845,415 | 2/1907 | Hicks | 193/46 X |
|---|---|---|---|
| 1,053,634 | 2/1913 | Nagy | 193/46 X |
| 1,446,591 | 2/1923 | Small | 193/46 X |
| 3,189,220 | 6/1965 | Mullaney | 221/259 X |
| 3,710,924 | 1/1973 | Schultz | 198/400 X |

*Primary Examiner*—Jeffrey V. Nase
*Attorney, Agent, or Firm*—Weingram & Klauber

[57] ABSTRACT

Apparatus for accepting an initially presented population of randomly oriented container caps and providing an output in-line stream of said caps wherein the open ends of the caps face in an upward direction to facilitate further processing of the caps. The apparatus comprises a feeder bowl for accepting the randomly oriented caps, and feeding from an output port thereof, an in-line stream of caps oriented in a substantially horizontal plane. An inclined twisting chute extends from the output of the feeder bowl. This chute receives the in-line stream of caps and twists the plane of advance of same through 90°, whereby the caps are reoriented to a stream wherein their diameters are substantially in a vertical plane. A guide chute extends at an incline from the output of the twisting chute, and include an input section for receiving the caps at their vertical orientation, an output section whereat the caps are oriented with their diameters parallel to the support surface, and a transition zone between the input and output sections whereat the caps may gravitationally tip and fall from the vertical plane to the reoriented, more nearly horizontal positions. A biasing device is provided for biasing the tipping of the caps, so that they fall with the open ends thereof facing in an upward direction.

8 Claims, 7 Drawing Figures

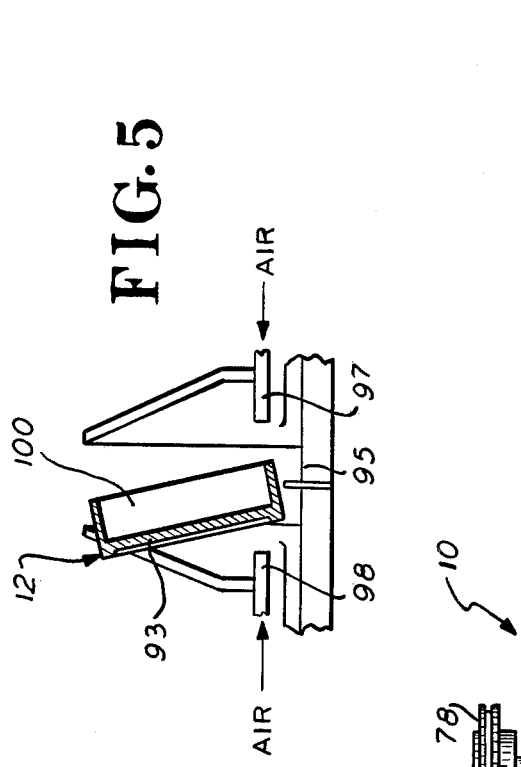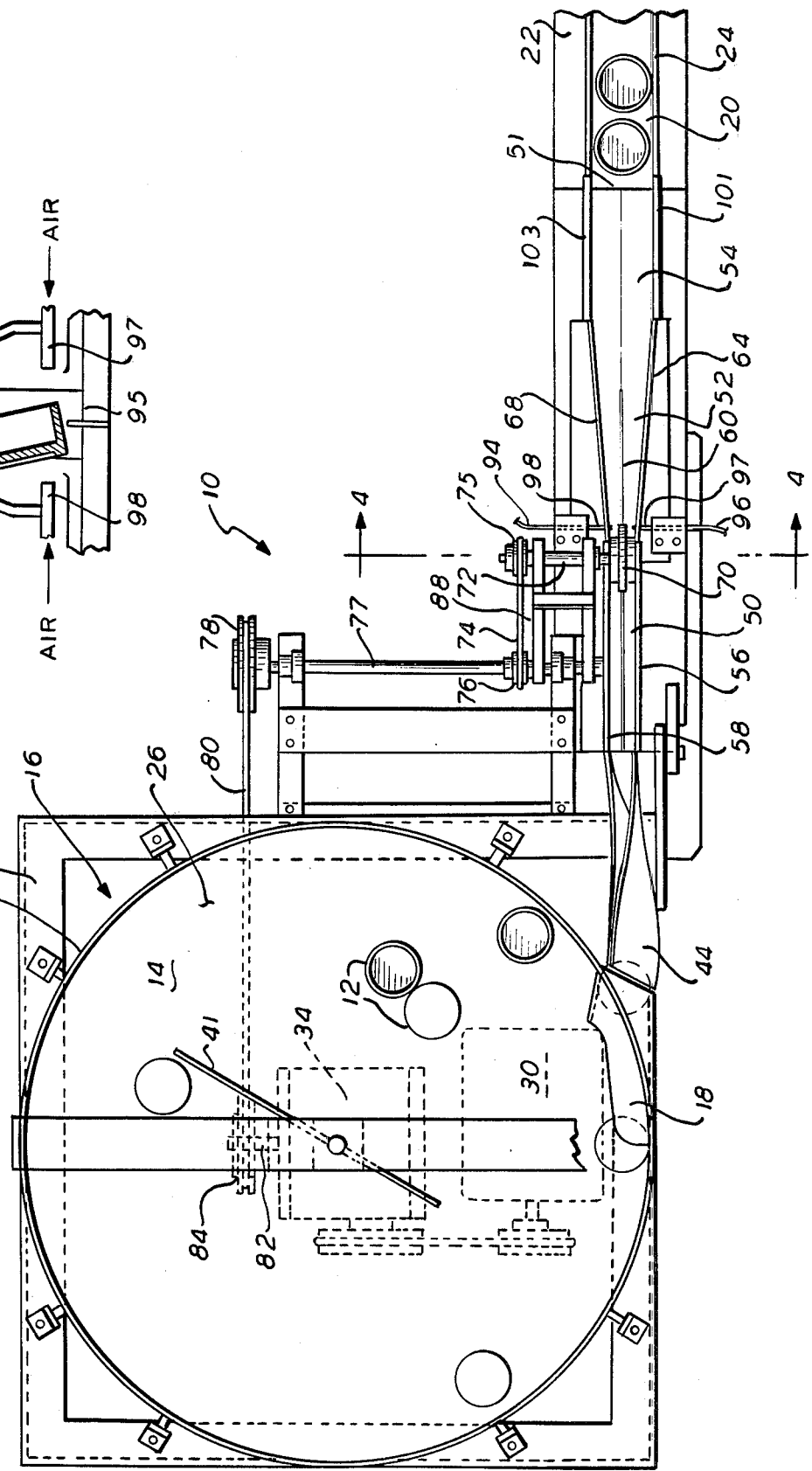

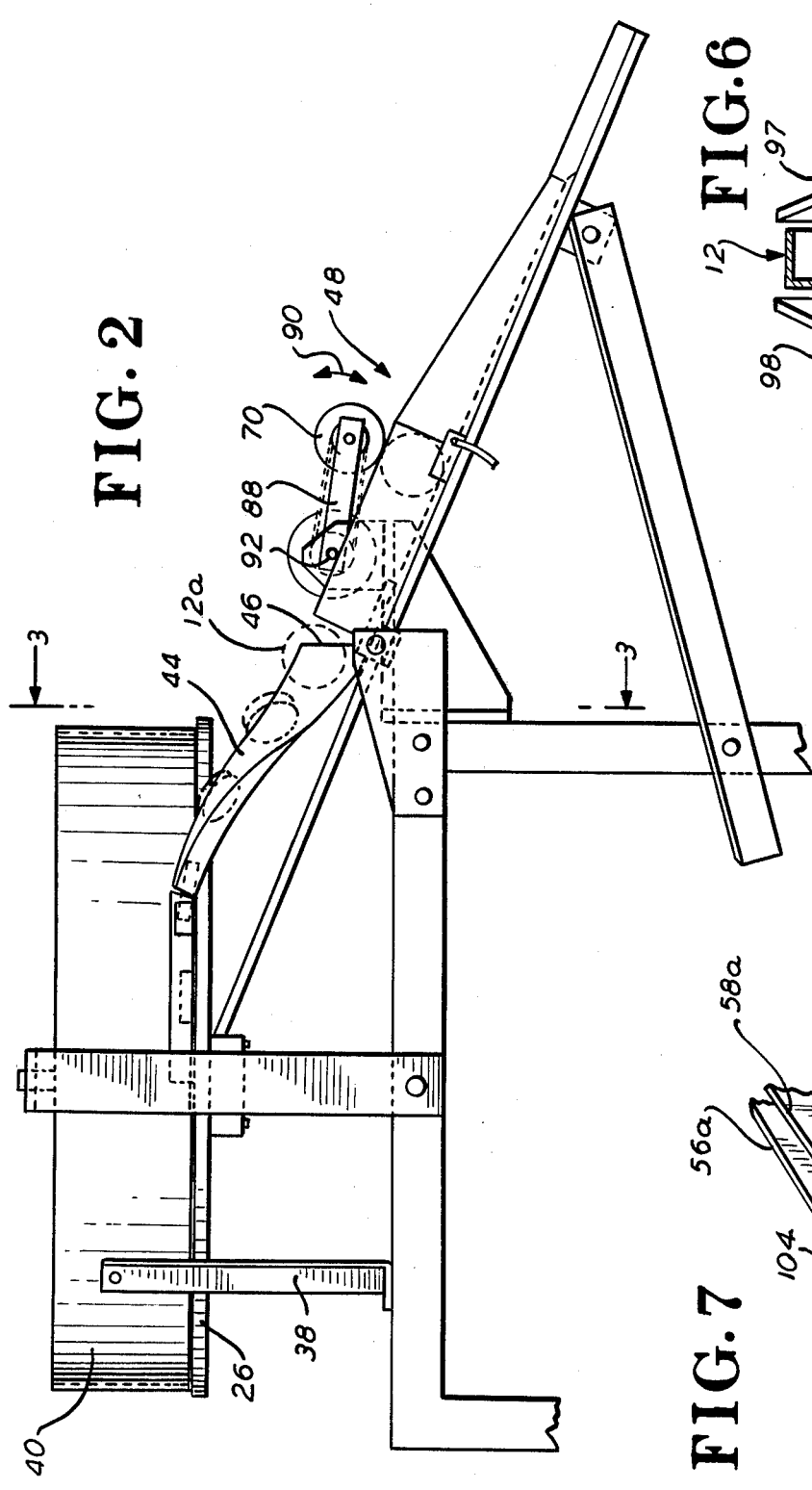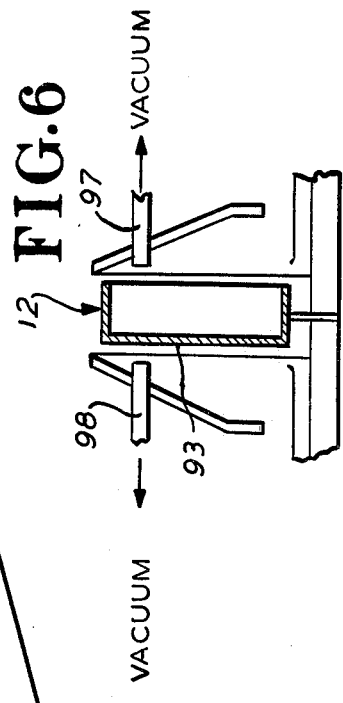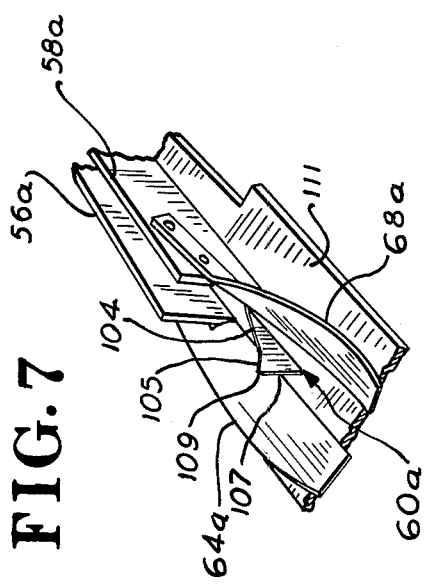

CAP ORIENTING AND FEEDING APPARATUS

BACKGROUND OF INVENTION

This invention relates generally to apparatus for processing container closures, caps, and similarly configured devices prior to use thereof, and more specifically relates to apparatus for orienting and feeding such devices, to thereby provide a stream of the items for further processing, e.g. by cap lining and testing apparatus, or for assembly or the like.

In the course of processing or assembling such objects as container closures, caps, lids or the like, a need often arises to uniformly orient the objects for the said processing or assembling operations. An example of such requirement occurs in connection with the apparatus disclosed in U.S. Pat. No. 4,055,455, which patent is in the name of two of the present inventors herein, and assigned to the assignee of the instant application. Such apparatus is useful in lining and testing container closures, such as caps or the like, and includes capabilities for both emplacing liners into the closures and caps, and as well capabilities for testing the caps and closures for a variety of defects which would impair the usefulness of same. The caps or closures to be thereby processed, must, however, be presented to the apparatus as an incoming stream, wherein each cap is oriented with its open end facing in an upward direction; i.e. this is necessary in order that all appropriate functions of the lining and testing apparatus be performed.

In the past various apparatus have been known in the art, which act upon a population of randomly oriented such objects, to provide an output of commonly oriented objects—such as an in-line stream of caps oriented with the open ends facing upwardly. However, prior art apparatus enabling such result, have generally been of unduly complex design, and of commensurate high cost and reduced dependability.

In accordance with the foregoing, it may be regarded as an object of the present invention, to provide apparatus capable of orienting and ordering a population of randomly arranged caps, container closures, or similarly formed objects, to yield an output stream wherein all such objects are uniformly oriented, thereby facilitating further processing of the said objects.

It is a further object of the invention to provide apparatus of the foregoing character, useful in orienting and ordering container caps or closures or the like, to provide a continuous in-line stream of commonly oriented such devices, e.g. a continuous stream wherein all caps are oriented with their open ends facing in a common direction.

It is a further object of the invention, to provide apparatus of the foregoing character, which apparatus is of relatively simple and dependable design, and of consequent relatively low cost construction.

SUMMARY OF INVENTION

Now in accordance with the present invention, the foregoing objects, and others as will become apparent in the course of the ensuing specification, are achieved in apparatus which is particularly adopted for use in the processing of container caps, but which is also useful in orienting and feeding similarly shaped objects, i.e. objects including an extended surface and an abounding wall oriented perpendicularly to the surface and extending predominantly in one direction from such surface—whereby a section of such object parallel to the normal to the surface will generally have a U-shaped configuration.

A preferred form of such apparatus useful in treating caps and container closures may thus include a feeder bowl adapted for accepting the population of randomly oriented caps and feeding from an output thereof a stream of said caps wherein the caps are oriented in a substantially horizontal plane—i.e. the caps as they leave the feeder bowl are oriented with their diameters parallel to the support surface. An inclined twisting chute extends from the feeder bowl output, receives the advancing stream of caps, and twists the plane of advance of same through 90°, whereby the caps are reoriented to a stream wherein their diameters are substantially in a vertical plane.

Guide chute means extend at an incline from the output of the twisting chute. The guide chute means include an input section for receiving the vertically oriented caps, an output section whereat the caps have become reoriented with their diameter parallel to the underlying chute surface, and a transition zone between the input and output sections, whereat the caps gravitationally tip and fall from the said vertical plane to the more nearly horizontal orientation. Means are provided for generating a biasing force, such that the caps tip so that the open ends thereof face in an upward direction.

The biasing means may include a knife-edge which extends centrally along the bottom of the guide chute, including at least in the input end of said transition zone, whereby such knife-edge supports the advancing caps in relatively unstable equilibrium. Constraining side walls at the input section of the guide chute prevent tipping of the said advancing caps. These walls, however, diverge at the transition zone, to thereby remove the constraints. Since the caps when standing on their edges, carry the bulk of their mass toward the top of the cap, the caps advancing edgewise on the knife-edge will thereupon tend to tip in the direction of their top, i.e. with the open portion facing upwardly—due to torque generated about the support line by the displacement of their center of gravity toward the said tops thereof.

In one embodiment of the invention, the knife-edge may terminate in an upwardly sloped portion, which by reducing the tendency of the caps to ride the edge, facilitates the desired tipping.

The biasing means may also include an auxiliary biasing force generator means, which further assures tipping in the desired direction. Such auxiliary means may for example, take the form of fluid pressure devices which act preferentially at one side of the cap as it enters the transition zone. For example, vacuum heads may be provided at alternate sides of the said zone, with a common vacuum source being provided to these heads. The greater proximity of the top of the said cap to the adjacent head, will cause a more negative pressure to act at that side of the cap, than at the open end of same, with resultant augmentation of tipping forces in the desired direction. Positive pressure sources can be utilized in a similar manner; and other mechanical means or the like can be likewise employed to augment the tipping torque.

BRIEF DESCRIPTIONS OF DRAWINGS

The invention is diagrammatically illustrated, by way of example, in the drawings appended hereto in which:

FIG. 1 is a top plan view of apparatus in accordance with the present invention;

FIG. 2 is a side elevational view of the apparatus of FIG. 1;

FIG. 5 is a somewhat schematic cross-sectional view of the input end of the transition zone, and illustrates use of positive pressure to augment the tipping biasing forces;

FIG. 6 is a schematic cross-sectional view similar to FIG. 5, but showing use of negative pressure, to effect the augmentation of biasing forces; and FIG. 7 is a fragmentary perspective view, of a further type of knife-edge biasing means, utilizable with the present invention.

DESCRIPTION OF PREFERRED EMBODIMENT

Figure 3:
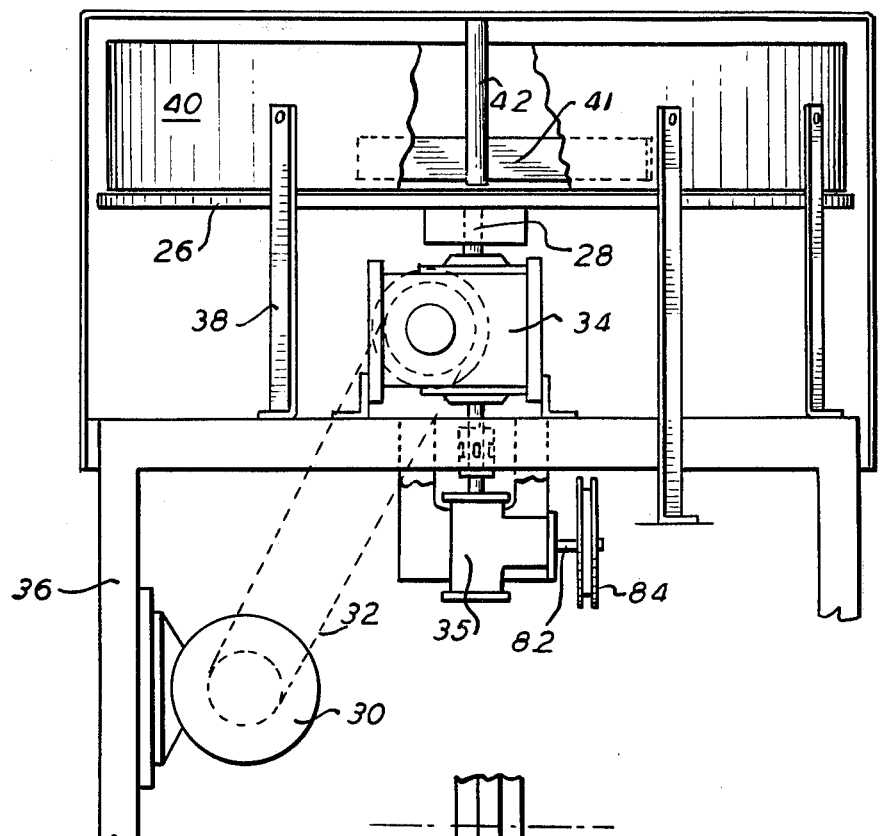
FIG. 3 is an elevational end view of the rearward and support portions of the present apparatus, the view being taken along the line 3—3 of FIG. 2.

In FIG. 1 herein, a top plan view appears of apparatus 10 in accordance with the present invention. FIG. 1 may be considered simultaneously especially with FIGS. 2 and 3 in order to better appreciate the arrangement of component elements thereof.

Referring to the general nature of the present apparatus 10, it is seen that in the first instance a population of randomly assorted closures or container caps, some of which are seen at 12, are loaded into the receiving chamber 14 of a feed bowl generally designated at 16. The caps 12 are fed from output port 18 of feed bowl 16, and after being reoriented and ordered by the remaining portions of the apparatus to be described, eventually are provided as an in-line stream 20 of caps, which may be provided e.g. to a conveyor belt 22 or the like, provided with underlying guide rails 24. This resultant stream 20 of caps are now all oriented with the caps' open ends facing in an upward direction—which is the desired orientation where such caps are e.g. to be provided for further processing to a lining and testing apparatus of the type disclosed in the aforementioned U.S. Pat. No. 4,055,455. In other instances the stream 20 of uniformly oriented caps can be reoriented to another direction—as may be appropriate to an assembly operation or so forth—, the important point being that the uniformity and continuity of stream 20 makes this a very simple operation.

The caps 12 may be of the general type also discussed in the aforementioned patent, i.e. typically these are plastic or metal caps or the like, intended for use in closing of containers, e.g. of the type associated with consumer products or the like. Thus the caps ultimately—upon reaching the further apparatus—may be provided with liners, and can be tested for various defects or so forth.

Feed bowl 16 is in most respects of conventional construction, and includes an underlying rotatable table or platform 26 (FIGS. 2 and 3), which rotates via shaft 28, in turn driven by a motor 30, transmission belt 32, and a reducer 34. All of these elements are ultimately secured to a frame 36. A plurality of uprights 38, support the peripheral wall 40, which together with platform 26 serves to define chamber 14.

As thus far described, feed bowl 16 is of substantially conventional construction. In order, however, to achieve in simple fashion an effective and continuing feed of closures 12 from output port 18, it will be noted that a flexible metal distributing blade or vane 41, extends from a stationary support piece 42. The blade 41 is of thin metal, and therefore, can flex in or counter to the direction of rotation of platform 26. More specifically as platform 26 rotates carrying the random cap population, the caps tend to impinge against blade 41, which flexes, and in turn deflects the caps to and toward the periphery, i.e. the output portions of platform 26. This in turn assures a continuing supply of caps 12 at the outer regions of the platform, and more specifically prevents agglomeration of such caps toward the center regions of platform 26.

By virtue of the continuing rotation of platform 26 and of the mentioned action of distributing blade 41, combined with the centrifugal forces acting on the caps, a supply of caps 12 is developed at the outer regions of platform 26, which introduces a continuing feed source proceeding to, and then through port 18. While caps 12 will commonly become horizontally oriented as they move about in space 14, port 18 may further be defined as a rectangular opening in wall 40, with the short dimension of the rectangle vertically oriented. This arrangement assures that only horizontally oriented caps will pass through the said port.

Port 18 is directly coupled to a twisting chute 44, which chute is adapted to receive the caps 12 in the substantially horizontal plane in which they exit from the feed bowl, and thereupon turn or twist the caps through 90° so that at the output 46 of chute 44 (FIG. 2), the caps have become reoriented to reside in a vertical plane, as e.g. can be seen from the cap 12a exiting from the chute 44. No specific drive means or the like are present in chute 44. The movement of the said caps therethrough is primarily under the influence of gravity, i.e. chute 44 is seen to decline at an angle from the output port 18 of feed bowl 16, and further, the pressure of the stream feeding from bowl 16 provides an additional positive force moving the stream of caps in and through twisting chute 44.

Pursuant to the present invention, a guide chute 48 extends from output end 46 of twisting chute 44, with the output from the guide chute consisting of the completely ordered series of caps that have been previously discussed, i.e. the output from guide chute 48 at end 51, is provided directly to a conveyor belt or the like, which will furnish such cap output to additional processing machinery.

Guide chute 48 may be regarded as including three in-line portions or sections, whereat differing functions are effected. These portions, however, join one another and hence, are basically part of the same overall structure. In particular the guide chute 48 can be regarded as including an input section 50 which receives the caps proceeding from twisting chute 44 at their substantially vertical orientation; an output section 54 at the far end of the guide chute whereat the caps have been reoriented to a more nearly horizontal plane, and more specifically, have been so oriented that their open ends all face in the desired upward direction; and a transition zone 52 between the input and output sections, whereat the caps may gravitationally tip and fall from the vertical plane to the desired orientation whereat their diameterincluding surface resides on the underlying portions of the chute.

The input section 50 is seen to include a pair of spaced side walls or guides 56 and 58 to alternate sides of the said section. These side walls sandwich and thereby constrain against sidewise movement, the vertically oriented caps as the latter are provided to section 50 from twisting chute 44. By reference to several Figures hereof, including especially FIG. 4, it will be seen that a thin support rail or knife-edge 60, extends centrally along the bottom plate 62 of section 50. Thus it is seen from FIG. 4 that as a cap 12 proceeds down the inclined section of guide chute 48, the peripheral surface 64 of the cap is supported upon, and rides on knife-edge 60, i.e. the cap effectively slides or rolls upon this edge 60, with the cap further being maintained in this vertical orientation by the aforementioned side walls 56 and 58 which thus act as constraints preventing tipping of the cap as it rides in contact with knife-edge 60.

Figure 4:
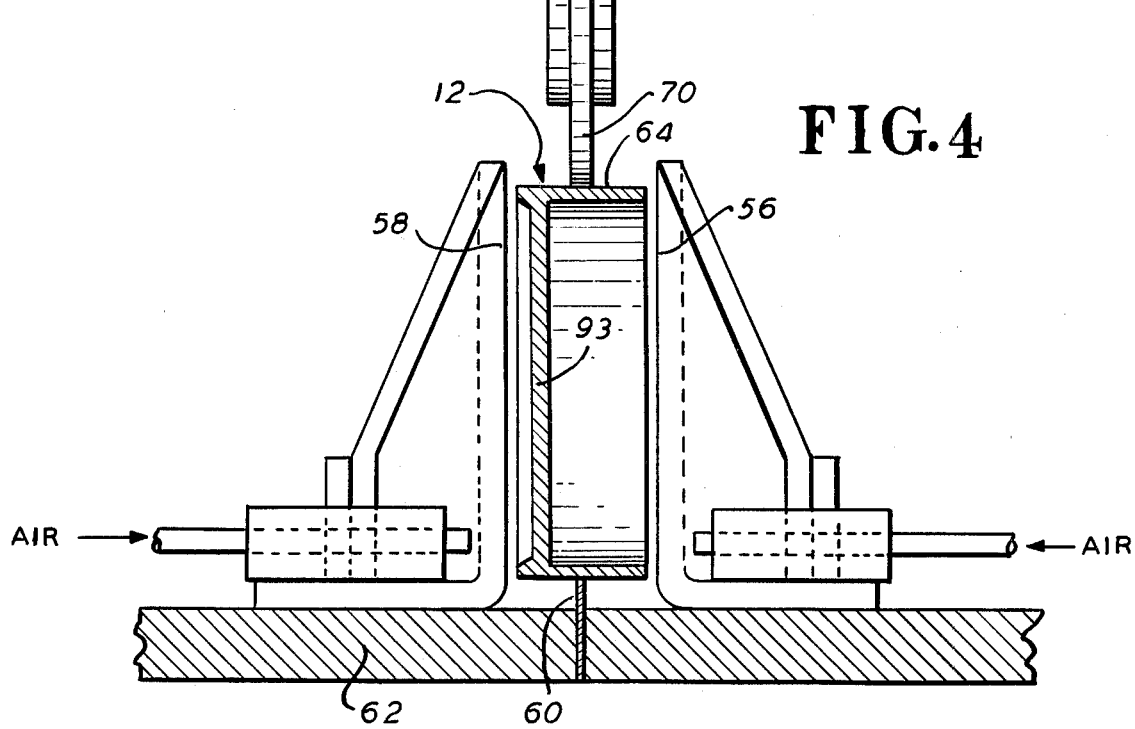
FIG. 4 is a cross-sectional view through the upper portion of the guide chute at approximately the location of the metering wheel, the said view being taken along the line 4—4 of FIG. 1.

In accordance with the mode of operation of the present apparatus, the caps as they emerge from section 50 into transition zone 52 will reach a point where the diverging side walls 64 and 68 provided at zone 52 will permit the caps (i.e. no longer constrained) to tip from the unstable condition of FIG. 4 to a more horizontal plane. Prior to further describing that action, however, it should be noted pursuant to a further aspect of the invention, that means are provided and associated with section 50, to enable a metered, regulated flow of the stream of caps which flow from section 50. Such metering and regulation not only is directed at providing a desired uniformity for the rate of cap flow; but moreover serves (as an incident of such regulation) to lower the velocity of advance of individual caps, so that as same pass through transition zone 52, the desired tipping at such zone will occur unerringly and efficiently.

More specifically it is seen that a driven rotatable metering wheel 70 is mounted in such manner as will enable same to peripherally contact and ride upon the edges of caps 12 as same proceed down and through section 50. The wheel 70 is driven by a shaft 72, in turn driven through belt 74 and pulley 75. Belt 74 is driven through pulley 76, shaft 77, pulley 78, and a belt 80, in turn coupled back to the shaft 82 through further pulley 84. Shaft 82 is seen from FIG. 3 to be driven by the reducer 34 previously referred to and a right angle drive 35. Pulley 84 preferably includes an adjustable shive means, for adjusting the rate of rotation of wheel 70 as to enable regulation of the feed rate of caps 12 proceeding from section 50.

It is further seen that shaft 72 of metering wheel 70 is journaled for rotation in a frame 88. Frame 88 has a degree of rotational freedom in the directions 90 (FIG. 2), i.e. about the axis 92, which action permits wheel 70 to ride in contact with the advancing caps, i.e. by bobbing in the directions 90 as the caps pass under the wheel in contact therewith. This action also permits a given wheel 70 to accommodate caps of differing diameters. The wheel 70 is preferably provided with a surface making good frictional engagement with the cap peripheries, as for example of natural or artificial rubber or the like.

As the caps pursuant to the action of the metering means enter transition zone 52, it will be clear that knife-edge 60 which extends into at least the receiving or forward portion of said zone, continues to support the advancing caps. It will be clear that even in the absence of any positive force application, removal of the constraining walls, i.e. by virtue of the diverging walls 64 and 68 at transition zone 52, will enable the caps to now fall in the desired direction by virtue of the following considerations: In particular, and referring for example to FIG. 4, it will be clear that with the cap 12 vertically oriented as shown, the bulk of the mass thereof (by virtue of the top 93) resides to one side of the supporting knife-edge 60—which edge 60 engages the cap essentially at the mid-line of its peripheral surface 65. Thus upon the side-wise constraints being removed, it is clear that a tipping torque can then act about support knife-edge 60, which torque will be in a direction as to cause the said caps to tip and fall in the desired direction—with the open ends thereof facing upwardly.

It will also be clear from the analysis of the preceeding paragraph, that the preferential tipping action which occurs at transition zone 52, is not limited to container caps or closures; but will generally occur where objects of the previously mentioned generally U-configured cross-section are fed through the present apparatus so that such objects as they enter zone 52 ride (or slide) on their peripheral wall. The principal requirement for such action to occur is simply that such objects when supported by their side wall residing upon knife-edge 60, be in a condition of unstable equilibrium, generated in consequence of their center of mass residing to one side of the supporting knife-edge. Clearly this condition will obtain for container caps, closures or the like; but also for such objects as box lids, various machine parts, appropriately shaped washers, or so forth.

Pursuant to a further aspect of the present invention, it has been found desirable in many instances to utilize auxiliary biasing force means to augment the torque which is naturally introduced as aforementioned. It may in this connection be noted that one reason why such auxiliary force can be advantageous, arises from a tendency of the caps—especially if advancing at a relatively high speed—to ride on knife-edge 60 for a considerable distance before the gravitationally induced torque can fully act. In extreme instances such extended riding can preclude the desired falling from being effected.

Thus referring to FIG. 1, it is seen that a pair of fluid application lines 94 and 96 may be provided, with the output heads 97 and 98 being to alternate sides of the approximate input to transition zone 52.

As seen in the schematic of FIG. 5, in one embodiment of the auxiliary biasing force means, positive air pressure may be provided to each head 97 and 98, the pressure in each instance being of equal magnitude. Because of the configuration of the cap it is found, however, that the pressure acting in the enlarged region 100 presented by the "interior" of the cap (i.e. in the orientation shown in FIG. 5), introduces a greater force at that side of the cap than at the plane surface 93 presented to head 98. In consequence, this greater force tends to produce a further biasing torque, directing tipping of the cap in the desired direction.

In FIG. 6 a similar arrangement to that described in FIG. 5 as shown. In this instance, however, the input to the heads 97 and 98 takes the form of an equal vacuum, i.e. in these instances suction is provided to each of the heads 97 and 98 from a common manifold. In this instance it is found that the reduced pressure tending to act at the surface 93—which is closer to head 98 than are any of the cap surfaces to head 97, produces once again a net torque tending to tip the said cap in the desired direction.

These auxiliary biasing forces, as mentioned, act in conjunction with the gravitationally-induced forces produced by balancing on the knife-edge 60, to achieve a substantially 100% tipping of advancing caps in the desired direction, i.e. with the open ends thereof facing in an upward direction. It should further be appreciated, that auxiliary biasing forces other than induced by the specific fluid pressure means discussed herein may be utilized in connection with the invention, including mechanical techniques and the like.

Upon caps 12 passing to output section 54, it will be clear that they are all properly oriented with their open ends facing upwardly. Parallel guide walls 101 and 103 at section 54 guide the advancing caps to output 51, where they are as desired, provided to or toward further processing devices as heretofore discussed.

In FIG. 7, herein, a side elevational view is shown of a knife-edge 60a, which in some instances produces superior results to those achievable with the knife-edge 60 of the prior Figures discussed. In particular, knife-edge 60, as has been mentioned, comprises an edge which is raised above the base 62 (FIG. 4) of transition zone 52 and extends in such transition zone parallel to base 62. As has been previously pointed out, however, the closures 12 can, by virtue of gyroscopic action, ride along the knife-edge 60 for a considerable distance before the desired tipping effect takes place. In many instances, the structure of FIG. 7 can obviate such undesired result.

Thus it will be seen from FIG. 7 that the knife-edge 60a is generally sloped in an upward direction from base 111 beyond side walls 56a and 58a; and thus possesses a ski-jump or a saw-tooth shape. Thus knife-edge 60a includes a first linearly sloped portion 104, and a second, more steeply sloped portion 105, which terminates abruptly at the vertical edge 107. Guide surfaces 64a and 68a again diverge from side walls 56a and 58a in transition zone 52; these surfaces, further, twist through an angle of about 90° as they proceed into zone 52.

In practice, it is found that as closures 12 ride along the knife-edge 60a, and more specifically along the sloped portions 104 and 105, they reach the discontinuity at apex 109, whereupon they fall in the proper direction against one or the other of the curved and diverging guide surfaces 64a and 68a. Beyond zone 52 the continuous cap stream proceeds to an output section 54, as in FIG. 1.

While the present invention has been particularly described in terms of specific embodiments therof, it will be understood in view of the instant disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

We claim:

1. Apparatus for accepting an initially presented population of randomly oriented container caps and providing an output in-line stream of said caps wherein the open ends of the caps face in an upward direction; said apparatus comprising in combination:

means for accepting said randomly oriented caps and feeding an in-line stream of said caps wherein the caps are oriented with their diameters substantially in a vertical plane;

inclined guide chute means having a base and including an input section for receiving said caps at said vertical orientation, an output section whereat said caps reside along their diameters, and a transition zone between said input and output sections whereat said caps may gravitationally tip and fall from the said vertical plane to their surfaces including said diameters; and means for biasing the said tipping of said caps so that said caps fall with the open ends thereof facing upwardly, said means comprising a knife-edge at the bottom of said guide chute means, said edge extending longitudinally and centrally along at least the lower end of the said input section and into said transition zone and ending in a portion sloped upwardly from said chute base and defined by first and second adjoined sections, with said second section being more steeply sloped from said chute base than said first section and terminating at an abrupt edge; guide walls being provided at the sides of the said input section for sandwiching and constraining said caps against tipping as said caps advance with the peripheries thereof riding on said knife-edge; said transition zone including diverging walls and the space immediately downstream of said abrupt edge defining a zone for unconstrained and unguided fall of said caps, whereby at said zone the caps riding on said knife-edge become unconstrained and tip and fall in the direction of their top surfaces, due to the center of gravity of said caps effecting a tipping torque about said knife-edge support in said direction, and due to the unconstrained and unguided fall of said caps upon passing said abrupt edge.

2. Apparatus in accordance with claim 1, further including auxiliary biasing force means acting at said transition zone, for augmenting the tipping torque induced by gravity.

3. Apparatus in accordance with claim 2 wherein said additional biasing force means comprise means for applying fluid pressure against said caps surfaces in a direction effecting said tipping.

4. Apparatus in accordance with claim 3 wherein said fluid pressure means comprise vacuum means for reducing the pressure at one side of said cap.

5. Apparatus in accordance with claim 3 wherein said additional biasing means comprise positive air pressure means for increasing the pressure at one side of said cap.

6. Apparatus in accordance with claim 1, further including metering means at said guide chute means, for metering the flow rate and slowing the velocity of said caps.

7. Apparatus in accordance with claim 6, wherein said metering means comprises a rotatable wheel mounted in overlying relationship to said cap stream at said input section of said guide chute; and means for rotating said wheel at a predetermined speed; said wheel surface serially engaging the peripheries of said caps to regulate the advance thereof in accordance with said predetermined speed of said wheel.

8. Apparatus for uniformly orienting a population of objects of the type comprising a surface and a wall extending about the perimeter of said surface in a direction perpendicular to the surface at the boundary therewith; said wall extending predominantly in one direction transverse to said surface; said apparatus comprising:

vertically orienting means for accepting said object population, and feeding a continuous stream of said objects, wherein said objects are oriented with the said surfaces thereof extending in a generally vertical direction and parallel to the direction of advance of said stream;

chute means for accepting the stream from said vertically orienting means, said chute means having a base and including a first portion having restraining side walls maintaining the said vertical orientation of said objects, and a second portion extending from said first portion and including a support knife-edge extending centrally along the base thereof; said second portion having diverging side walls, whereby said objects are supported at said second portion in unstable equilibrium solely by said support knife-edge centrally underlying said perimeter wall, said knife-edge ending in a portion sloped upwardly from said chute base and defined by first and second adjoined sections, with said second section being more steeply sloped from said chute base than said first section and terminating in an abrupt edge, whereby said objects will become unconstrained and tip from said support edge in the direction of said surfaces, by virtue of the center of gravity of said objects residing in said direction with respect to said support, and due to the unconstrained and unguided fall of said objects upon passing said abrupt edge.

* * * * *